United States Patent
Chatterjee et al.

(10) Patent No.: US 11,200,886 B2
(45) Date of Patent: Dec. 14, 2021

(54) SYSTEM AND METHOD FOR TRAINING A VIRTUAL AGENT TO IDENTIFY A USER'S INTENT FROM A CONVERSATION

(71) Applicant: Accenture Global Solutions Limited, Dublin (IE)

(72) Inventors: Ajay Chatterjee, Bangalore (IN); Shubhashis Sengupta, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 261 days.

(21) Appl. No.: 16/373,373

(22) Filed: Apr. 2, 2019

(65) Prior Publication Data

US 2020/0320978 A1     Oct. 8, 2020

(51) Int. Cl.
*G10L 15/06*     (2013.01)
*G10L 15/18*     (2013.01)

(52) U.S. Cl.
CPC ........ *G10L 15/063* (2013.01); *G10L 15/1822* (2013.01)

(58) Field of Classification Search
None
See application file for complete search history.

(56) References Cited

U.S. PATENT DOCUMENTS

| | | | |
|---|---|---|---|
| 2011/0238408 A1* | 9/2011 | Larcheveque | G06F 40/284 704/9 |
| 2015/0051910 A1* | 2/2015 | Lavallee | G10L 15/063 704/245 |
| 2018/0144742 A1* | 5/2018 | Ye | G10L 17/04 |
| 2018/0293978 A1* | 10/2018 | Sinha | G06N 7/005 |
| 2019/0180175 A1* | 6/2019 | Meteer | G06F 3/04812 |
| 2019/0182382 A1* | 6/2019 | Mazza | G10L 15/26 |
| 2019/0188590 A1* | 6/2019 | Wu | H04L 51/02 |
| 2019/0294673 A1* | 9/2019 | Sapugay | G06F 16/2465 |
| 2019/0347319 A1* | 11/2019 | Goyal | G10L 15/32 |
| 2020/0043471 A1* | 2/2020 | Ma | G10L 15/07 |
| 2020/0082214 A1* | 3/2020 | Salammagari | H04L 51/02 |
| 2020/0082811 A1* | 3/2020 | Yadav | G10L 15/26 |

* cited by examiner

*Primary Examiner* — Jonathan C Kim
(74) *Attorney, Agent, or Firm* — Plumsea Law Group, LLC

(57) ABSTRACT

A system and method for training a virtual agent to identify a user's intent from a conversation is disclosed. The system and method use an iterative process of clustering multiple conversations (converted into feature representations) used for training a machine learning model into labeled clusters having similar user intents. Clustering enables labeling a large number of training conversations efficiently. The labeled clusters may be used to train a virtual agent to classify the conversational intent of a conversation. Then, the machine learning model can classify future conversations based on similarity to labeled clusters. By knowing a human user's intent, a virtual agent can deliver what the user desires.

20 Claims, 7 Drawing Sheets

SYSTEM AND METHOD FOR TRAINING A VIRTUAL AGENT TO IDENTIFY A USER'S INTENT FROM A CONVERSATION

TECHNICAL FIELD

The present disclosure generally relates to natural language understanding. More specifically, the present disclosure generally relates to a system and method for training a virtual agent to identify a user's intent from a conversation.

BACKGROUND

Natural language understanding systems interpret the word sequences of user utterances. For example, natural language understanding systems are used by task-oriented virtual agents. Virtual agents are computer-generated agents that can interact with users. Goal- or task-oriented virtual agents may communicate with human users in a natural language and work with or help the users in performing various tasks. The tasks performed by a virtual agent can vary in type and complexity. Exemplary tasks include information retrieval, rule-based recommendations, as well as navigating and executing complex workflows. Informally, virtual agents may be referred to as "chatbots." Virtual agents may be used by corporations to assist customers with tasks such as booking reservations and working through diagnostic issues (e.g., for solving an issue with a computer). Using virtual agents may offer a corporation advantages by reducing operational costs of running call centers and improving the flexibility with which a company can increase the number of available agents that can assist customers.

Natural language understanding systems help virtual agents identify what the human user desires. For example, the natural language understanding system may have an intent model that finds the user's intent from the user's utterances. Then, a downstream component of the virtual agent, such as a dialogue manager, can use the intent to identify how to respond to the human user.

Some intent models look for similarity to past utterances with known (labeled) intent to identify the unknown intent of a new utterance. A difficulty with this method can come with the training process of labeling a large number of past utterances.

There is a need in the art for a system and method that addresses the shortcomings discussed above.

SUMMARY

A system and method for training a virtual agent (or conversation system) to identify a user's intent from a conversation (or dialogue) is disclosed. The system and method solve the problems discussed above by using an iterative process of clustering meta data (converted into feature representations) from multiple conversations used for training a machine learning model into labeled clusters having similar user intents. Clustering enables labeling meta data from a large number of training conversations efficiently. By labeling a single cluster, many data points can be labeled at once. For example, clustering can narrow meta data from 10,000 conversations to 200 clusters, each of the clusters varying in number of data points (e.g., 180 data points in one cluster and 40 data points in another cluster). By labeling 200 clusters, you reduce the time/effort/resources (including computer or network resources, for example) needed to label 10,000 individual conversations. The labeled clusters may be used to train a virtual agent to classify the conversational intent of a conversation. Then, the machine learning model can classify future conversations based on similarity to labeled clusters. By knowing a human user's intent, a virtual agent can deliver what the user desires.

While simply clustering conversations can reduce the effort required to label data points, a single run of clustering may not be sufficient. For example, a single run of clustering may lead to outliers (data points not identified as part of a cluster) that would have to be individually labeled if the clustering process stopped after a single run. The disclosed system and method include an iterative clustering process that helps reduce the number of outliers by performing a subsequent clustering process on the outliers from a previous clustering process. For example, a second clustering process performed on outliers from a first clustering process can help identify clusters among the outliers from the first clustering process. The previous clustering process has at least one adjustable parameter. For the subsequent clustering process, the at least one adjustable parameter can be adjusted. In another example, if a second clustering process yields any outliers, a third clustering process can be performed with another adjusted parameter on these outliers. The clustering process can be repeated until the model reaches the stopping criteria or no new clusters are found over few iterations A factor making it harder to train a machine learning model to discover user intent is when the labeled data has an unbalanced distribution of data points. An unbalanced dataset can bias the clustering towards the more common class. For example, if hundreds of past conversations have the intent of "help with logging in" and only three past conversations have the intent of "help with bulk email digest", then clustering may result in the three past conversations having the intent of "help with bulk email digest" to be mislabeled as having the intent of "help with logging in". The disclosed system and method for training a virtual agent (or conversation system) to identify a user's intent from a conversation includes an iterative clustering process that helps reduce the number of mislabeled data points. For example, a first run of clustering can be performed with parameters for the clustering model set to find a more common class. Then, this more common class can be removed from the data points. During a second run on the remaining points (which can be performed with one or more adjusted parameters), the absence of the more common class means that the clustering will not be biased toward the more common class. Also, using an iterative clustering process that applies at least one adjustable parameter can help fine tune each subsequent clustering process by adjusting the at least one adjustable parameter.

The iterative clustering process improves the quality of labeling by reducing the number of mislabeled data points (data points found to be in a cluster with conversations having a different user intent) from previous clustering processes and running them again through subsequent clustering processes in which at least one parameter is adjusted. A subsequent clustering process can give a mislabeled data point another chance at being part of a cluster labeled with the proper corresponding user intent.

In one aspect, the disclosure provides a method training a virtual agent to identify user's intent from a conversation. The method may include receiving a set of conversations and related meta data. The set of conversations may each comprise a word sequence including a plurality of words. The method may include converting each of the set of conversations and related meta data into a set of feature representations in a multi-dimensional vector space. The method may include using density-based spatial clustering of applications with noise (DBSCAN) to identify a first set of clusters among the set of feature representations, the DBSCAN model including at least one adjustable parameter. The method may include generating a subset of feature representations by filtering the feature representations in the first set of clusters from the set of feature representations. The method may include adjusting the at least one adjustable parameter of the DBSCAN model. The method may include using the DBSCAN model with the adjusted parameter to identify a second set of clusters among at least the subset of feature representations. The method may include training the virtual agent to classify the conversational intent of a conversation using the first set of clusters and the second set of clusters.

In another aspect, the disclosure provides a non-transitory computer-readable medium storing software that may comprise instructions executable by one or more computers which, upon such execution, cause the one or more computers to: (1) receive a set of conversations and related meta data, wherein the set of conversations each comprise a word sequence including a plurality of words; (2) convert each of the set of conversations and related meta data into a set of feature representations in a multi-dimensional vector space; (3) use density-based spatial clustering of applications with noise (DBSCAN) to identify a first set of clusters among the set of feature representations, the DBSCAN model including at least one adjustable parameter; (4) generate a subset of feature representations by filtering the feature representations in the first set of clusters from the set of feature representations; (5) adjust the at least one adjustable parameter of the DBSCAN model; (6) use the DBSCAN model with the adjusted parameter to identify a second set of clusters among at least the subset of feature representations; and (7) train the virtual agent to classify the conversational intent of a conversation using the first set of clusters and the second set of clusters.

In another aspect, the disclosure provides a system for training a virtual agent to identify user's intent from a conversation, comprising one or more computers and one or more storage devices storing instructions that may be operable, when executed by the one or more computers, to cause the one or more computers to: (1) receive a set of conversations and related meta data, wherein the set of conversations each comprise a word sequence including a plurality of words; (2) convert each of the set of conversations and related meta data into a set of feature representations in a multi-dimensional vector space; (3) use density-based spatial clustering of applications with noise (DBSCAN) to identify a first set of clusters among the set of feature representations, the DBSCAN model including at least one adjustable parameter; (4) generate a subset of feature representations by filtering the feature representations in the first set of clusters from the set of feature representations; (5) adjust the at least one adjustable parameter of the DBSCAN model; (6) use the DBSCAN model with the adjusted parameter to identify a second set of clusters among at least the subset of feature representations; and (7) train the virtual agent to classify the conversational intent of a conversation using the first set of clusters and the second set of clusters.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

As discussed above, the disclosed system and method includes using an iterative process of clustering multiple conversations used for training a machine learning model into labeled clusters having similar user intents. In some embodiments, the clustering process may include a DBSCAN model. To put the training conversations into a format that can be used by a machine learning model, each of the conversations may be converted into feature representations making up data points in a multi-dimensional vector space. The DBSCAN model can be used in a first run to identify a first set of clusters among the feature representations. In this first run, a first set of parameters of the DBSCAN model can include at least one adjustable parameter. For example, one or both of the distance between data points in a cluster and the minimum number of data points in a cluster may be adjustable. The first run of the DBSCAN model may result in a portion of the data points identified as forming the first set of clusters and noise points identified as not forming the first set of clusters. In this case, filtering the first set of clusters leaves a subset of the feature representations including data points that do not form part of the first set of clusters.

A second run of the DBSCAN model can be used to identify a second set of clusters among the subset of feature representations. In the second run, the at least one adjustable parameter of the DBSCAN model can be adjusted. This adjusted parameter changes the definition of clusters. In some embodiments, data points that were mislabeled in the first run of the DBSCAN model can be added to the subset of feature representations during the second run (or in any subsequent run). If the second run leaves behind unclustered data points (noise/outliers), a third run of the DBSCAN model can be used with a newly adjusted parameter to identify a third set of clusters. The process of adjusting at least one parameter and running the DBSCAN model on noise and/or mislabeled data points can be repeated until the model reaches the stopping criteria or no new clusters are found over few iterations.

The found clusters, including the first set of clusters, second set of clusters, third set of clusters, etc. may each be assigned a label associated with an intent. The labeled clusters may be used to train the virtual agent to classify the conversational intent of a conversation.

In some embodiments, after any run of the DBSCAN model, a human may review the conversations within a cluster and determine that the conversation does not fit the intent assigned to the cluster. In this case, the conversation may be included with the unclustered data points in the next run of the DBSCAN model. This way, a mislabeled conversation could have another chance at being properly labeled in a subsequent run of the DBSCAN model.

Figure 1:
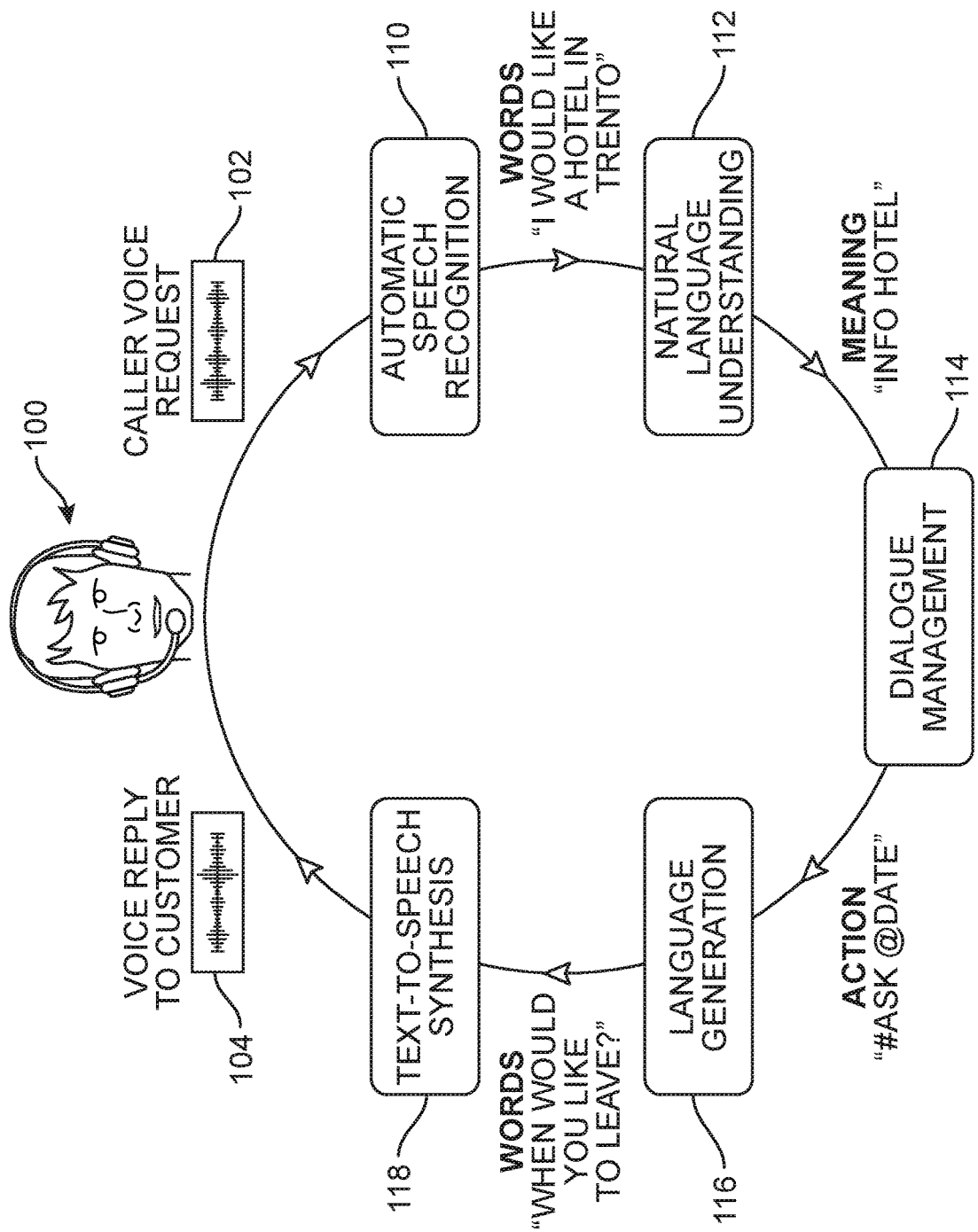
FIG. 1 is a schematic diagram of an embodiment of a virtual agent that corresponds with a customer.

In some embodiments, the disclosed system and method may be part of a natural language understanding system or a spoken language understanding system. And in some embodiments, the natural language understanding system comprises a sub-system of a virtual agent. The virtual agent takes in requests from a customer (or other end user) and processes the requests before responding back to the customer. To process requests from a customer and respond appropriately, the virtual agent may include multiple subsystems or modules that help solve various subtasks (e.g., voice recognition). For example, FIG. 1 shows an exemplary virtual agent 100 including a series of processes that occur between a request 102 (e.g., "caller voice request") and a response 104 (e.g., "voice reply to customer"). While the exemplary embodiment depicts a conversation that occurs as a phone call between virtual agent 100 and a customer, in other embodiments a virtual agent could communicate with a customer through other means including text-based communication (e.g., SMS or a chat-based application) and/or video communication (e.g., using Skype or Facetime).

Following the exemplary process characterized in FIG. 1, request 102 is first processed by an automatic speech recognition system 110. The goal of speech recognition system 110 is to convert spoken words into a string, or sequence, of words that can be used by systems downstream of speech recognition system 110. For example, speech recognition system 110 may convert a received audio signal (the customer's request over the phone) into the string, or sequence, of words "I would like a hotel in Trento." This sequence of words is then passed to a natural language understanding system 112.

The goal of natural language understanding system 112 is to extract the meaning of the string of words passed on from speech recognition system 110. For example, natural language understanding system 112 may analyze the phrase "I would like a hotel in Trento" and determine that the customer is looking for information about a hotel. More specifically, in some embodiments, the natural language understanding system takes in a word sequence as input and outputs (1) the dialogue act category (e.g., question, command, or information) of the word sequence, (2) the intent of the user, and (3) slot names and values. The intent corresponds to the topic of the word sequence (e.g., "flights", "hotels", "restaurants," etc.). Slots correspond to goal-relevant pieces of information. The slot name refers to a type or category of information that may be domain specific, such as "location" or "check-in date" in the context of booking a hotel. The slot values correspond to the particular choice for the slot name, such as "Trento" for the slot name "location."

The outputs of natural language understanding system 112, which provide the extracted meaning of a word sequence, may be passed to dialogue management system 114. In the example shown in FIG. 1, the extracted information "info hotel" is provided to dialogue management system 114. However, it may be appreciated that in some cases the passed information could include the category, intent, and list of slot names/values corresponding to the original word sequence.

The goal of dialogue management system 114 is to track the current state of the dialogue between virtual agent 100 and the customer and to respond to the request in a conversational manner. Dialogue management system 114 generates an action based on the information received from natural language understanding system 112, as well as the state of the dialogue with the customer.

The action immediately output by dialogue management system 114 may be symbolic in nature (e.g., "#ask @date"). This symbolic output is then converted into a natural language response by a language generation system 116. For example, language generation system 116 may receive input from dialogue management system 114 (e.g., "#ask @date") and output a string of words (e.g., "when would you like to leave?"). These words may then be converted into an audible response 104 by text-to-speech synthesis unit 118. It may be appreciated that this cycle represented by FIG. 1 may be repeated after each customer request (or other utterance) such that virtual agent 100 provides a response and continues a conversation with the customer until the customer goals have been met.

Figure 2:
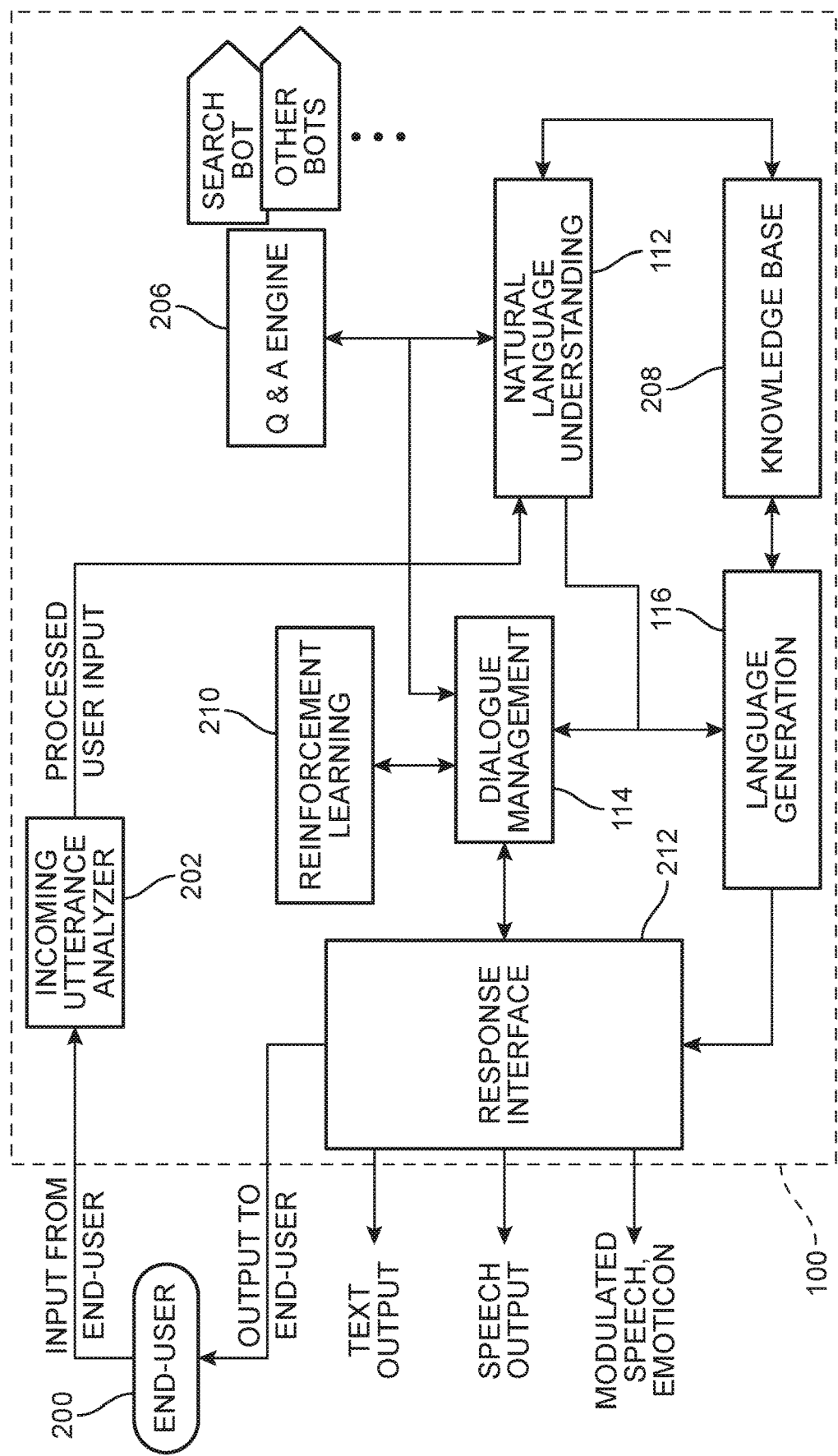
FIG. 2 is a schematic diagram of an embodiment of an architecture of a virtual agent.

A virtual agent may include additional subsystems and modules to achieve the goal of conversing with a customer and achieving the customer goals. For example, FIG. 2 is a schematic view of an embodiment of an architecture for virtual agent 100. Referring to FIG. 2, an end user 200 communicates with virtual agent 100. Communication may occur through various modes, including text-based chat programs that may run on a desktop, laptop or mobile device, telephone calls, audio and/or video calls transmitted over the internet (e.g., through services such as Skype) as well as other known modes of communication.

Input from end user 200 may be received and processed by an incoming utterance analyzer 202. In some cases, incoming utterance analyzer 202 may identify the type of input (e.g., audio, text, gestures, etc.) and direct the input to the proper sub-module (such as an automatic speech recognition module for audio input or a gesture interpreter for gesture-based inputs). The processed user input, which may take the form of strings of words, can then be passed to natural language understanding system 112 to extract meaning from the end-user input.

Natural language understanding system 112 may further communicate with dialogue management system 114. In some cases, natural language understanding system 112 may also directly communicate with language generation system 116. Language generation system 116 can include modules to facilitate converting symbolic (or otherwise coded) output into a natural language format. Such modules could include a randomized machine utterance generator and a narrative generator. In some cases, natural language utterances may be generated using a Sequence Generative Adversarial Net (seqGAN).

A virtual agent can include provisions for gathering information. For example, in FIG. 2, natural language understanding system 112 and/or dialogue management system 114 may communicate with a Q&A ("Question & Answer") Engine 206. Q&A Engine 206 can include sub-modules for identifying a question and determining if the question has been previously stored (or indexed) or if it is a new question. Q&A Engine 206 can also include provisions for searching for information on the web or in other systems accessible by virtual agent 100. For example, to look up the answer to a particular question, Q&A Engine 206 may use a search bot and/or other kinds of bots. In some cases, Q&A Engine 206 may access external services through an application protocol interface (API).

A virtual agent can include provisions for storing various kinds of information. For example, virtual agent 100 can include a knowledge base system 208. Knowledge base system 208 could include databases for storing a training collection, user and state info, and various kinds of domain specific knowledge (e.g., in the form of a graph).

A virtual agent can include provisions for learning to converse with an end user in a natural manner. For example, virtual agent 100 may include a reinforcement learning module 210. In the example of FIG. 2, dialogue management system 114, which may be trained using reinforcement learning processes as described above, can communicate directly with reinforcement learning module 210. In some cases, reinforcement learning module 210 may only be accessed during training sessions. In other cases, reinforcement learning module 210 may be accessed while virtual agent 100 is engaged with an end user, including a real customer. It may be appreciated that in some cases, other systems of virtual agent 100 could also communicate with, and utilize the resources of, reinforcement learning module 210.

Output to a user is provided at a response interface system 212. Response interface system 212 may communicate with dialogue management system 114 and/or language generation system 116. Information received from either of these units can be converted into a final output intended for end user 200. Response interface system 212 may therefore be capable of converting inputs from other systems into text, speech, and/or other kinds of expressions (such as modulated speech, emoticons, etc.).

A virtual agent and associated systems for communicating with a virtual agent may include one or more user devices, such as a computer, a server, a database, and a network. For example, a virtual agent running on a server could communicate with a user over a network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN. In embodiments where a user talks to a virtual agent using a phone (e.g., a landline or a cell phone), the communication may pass through a telecom network and/or a wide area network.

The user device may be a computing device used by a user for communicating with a virtual agent. A computing device could be may a tablet computer, a smartphone, a laptop computer, a desktop computer, or another type of computing device. The user device may include a display that provides an interface for the user to input and/or view information. For example, a user could interact with a virtual agent using a program run on a laptop computer, such as a text-based chat program, a voice-based communication program, and/or a video-based communication program. Alternatively, in some cases, the user device could be a telephone (e.g., a landline, cell phone, etc.).

One or more resources of a virtual agent may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

Figure 3:
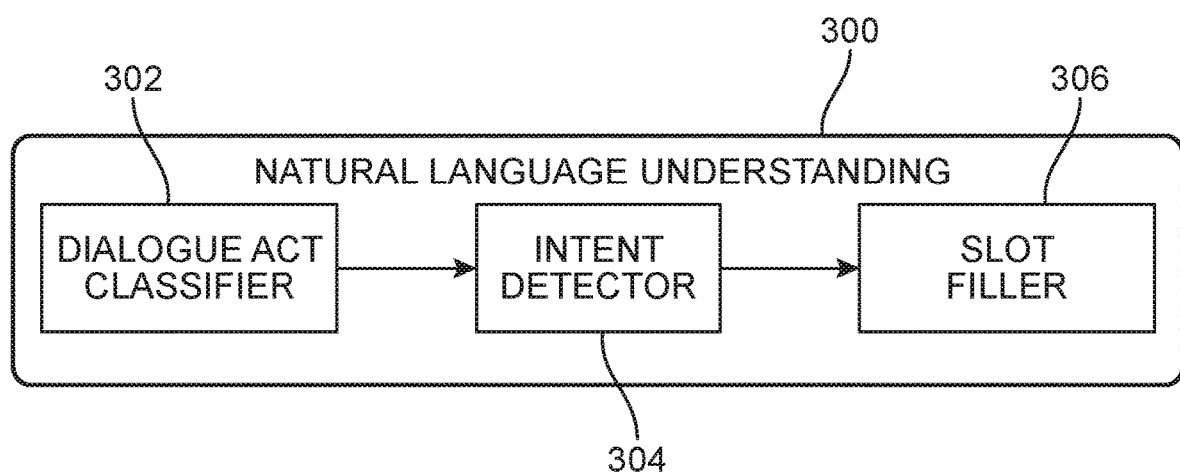
FIG. 3 is a schematic diagram of an embodiment of a natural language understanding system.

This disclosure focuses on an intent mining module, which could be used to train an intent detector of a natural language understanding system. To illustrate how an intent detector could be used with a natural language understanding system, FIG. 3 shows a schematic diagram of an embodiment of a natural language understanding system 300. The natural language understanding system includes three main components: a dialogue act classifier, an intent detector, and a slot filler. For example, natural language understanding system 300 includes a dialogue act classifier 302, an intent detector 304, and a slot filler 306. The dialogue act classifier classifies a word sequence into a dialogue act category. Rather than focus on the specific topic of the word sequence, the dialogue act category defines the type of communication indicated by the word sequence. Examples of dialogue act categories include question, greeting, command, and information. In one example, if a user says, "I want to fly from Seattle to Chicago," then the category is "command." In another example, if a user says, "I want to eat Chinese food that is medium-priced and from restaurants that are in the eastern part of the city," then the category is "command." In yet another example, if the user asks, "what is the weather like today?", then the category is "question." In yet another example, if the user says, "hello", then the category is greeting.

The slot filler extracts constituents from the word sequence. In other words, the slot filler finds goal-relevant pieces of information in the word sequence to determine which slot information, including slot names and slot values apply to the situation. For example, if a user says, "I want to fly from Seattle to Chicago," then the slots for this string of words could be "From-City" and "To_City." The value for the "From-City" slot is "Seattle" and the value for "To_City" is "Chicago." In another example, if a user says, "I want to eat Chinese food that is medium-priced and from restaurants that are in the eastern part of the city," the slots for this string of words could be "food", "price", and "area". The value for "food" is "Chinese". The value for "price" is "medium". The value for "area" is "Eastern".

As understood from above, the intent detector identifies the user's intent. The intent detector focuses on the specific topic of the word sequence to determine what it is the user desires. Examples of intents include flight, ground transportation, restaurant, and computer fault diagnosis. In one example, if a user says, "I want to fly from Seattle to Chicago," then the intent is "flight." In another example, if a user says, "I can't log into my email," then the intent is "logging in." It is understood that the intent detector may be used by itself or in conjunction with the dialogue act classifier and/or slot filler.

Figure 4:
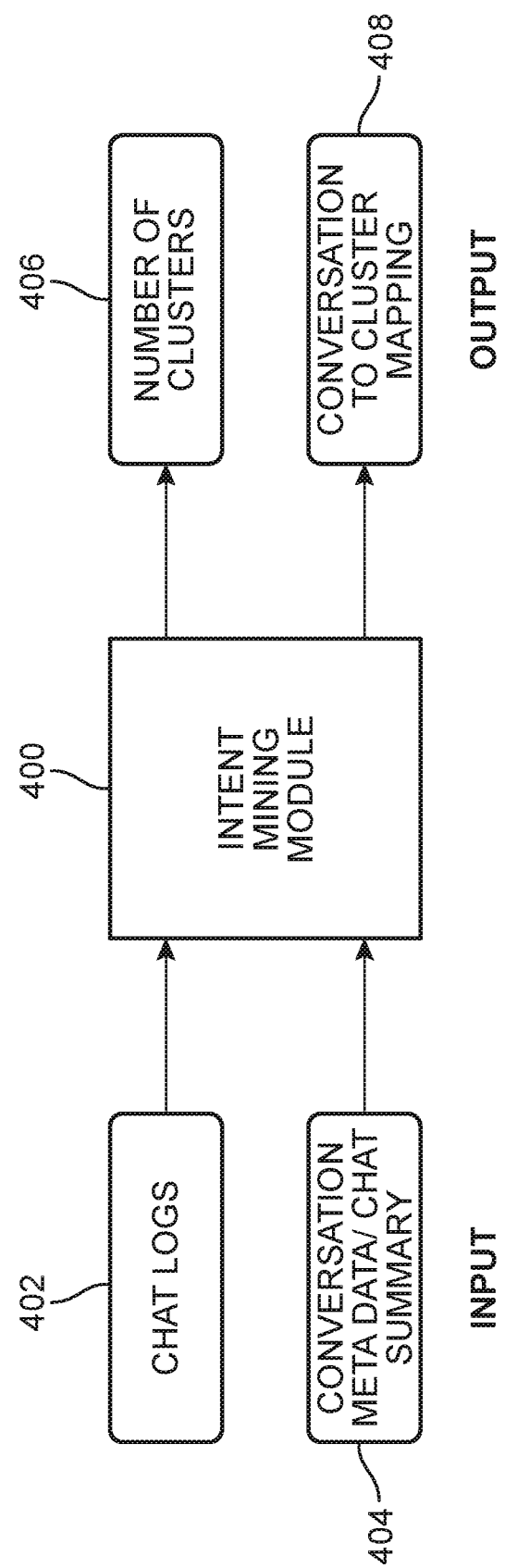
FIG. 4 is a schematic diagram of a flow of general inputs and outputs for an intent mining module, according to an embodiment.

FIG. 4 is a schematic diagram of a flow of general inputs and outputs for an intent mining module 400, according to an embodiment. The inputs in this embodiment include chat logs 402, as well as conversation meta data and chat summaries 404. The outputs in this embodiment include number of clusters 406 and conversation to cluster mapping 408. Viewing the number of clusters can help the user perceive how many groups have been formed from the dataset. In some embodiments, the conversation to cluster mapping may include using clusters labeled with user intents to label the individual conversations within the clusters.

Figure 5:
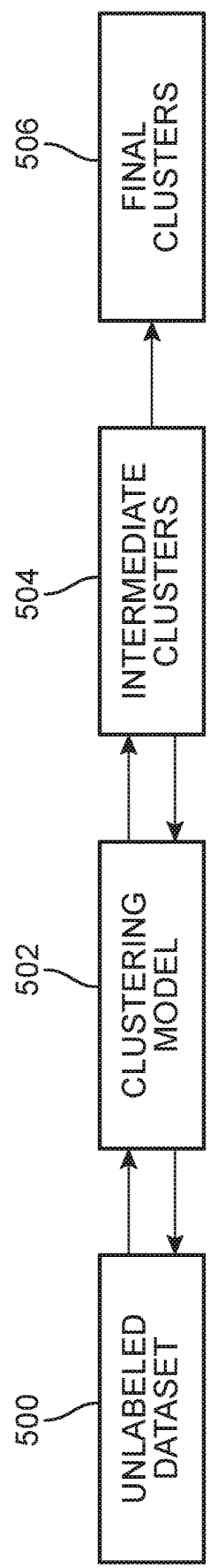
FIG. 5 is a schematic diagram of a high level flow of clustering, according to an embodiment.

FIG. 5 is a schematic diagram of a high level flow of clustering, according to an embodiment. In this flow, an unlabeled dataset 500 is received by a clustering model 502 that identifies an intermediate set of clusters 504 within the unlabeled dataset 500. Any conversations within intermediate set of clusters 504 found to be appropriately clustered with conversations having a similar user intent are saved as final clusters 506. Any conversations within intermediate set of clusters 504 found to be inappropriately clustered with conversations having a different user intent are returned to clustering model 502 as unlabeled data for a subsequent run through the clustering process. After the subsequent run, any conversations within intermediate set of clusters 504 found to be appropriately clustered with conversations having a similar user intent are saved as final clusters 506.

As illustrated by the embodiment shown in FIG. 5, the clustering model runs multiple iterations over the data. The iterative process can adapt the problem space to find large clusters first and then increasingly smaller clusters in subsequent iterations. Adapting the problem space in this manner may include changing the parameters of the clustering process. For example, the parameters for a DBSCAN model includes $\varepsilon$, a parameter specifying the radius of a neighborhood with respect to some point, and minPts, the minimum number of points required to form a dense region (or cluster). In some embodiments, a cosine measure is used as a distance function for calculating the clusters. Finding large clusters first and then finding increasingly smaller clusters can be done by increasing the distance and/or reducing the minimum number of points used to define a cluster at each iteration of the clustering process. In some embodiments, the model can stop searches when the distance become too large or number of minimum points decrease to a certain limit.

Using the embodiment shown in FIG. 5 as an example, at each iteration clustering model 502 may cluster a high density area according to a parameter definition to find intermediate clusters 504. Any outlier points resulting from an iteration can be added back to unlabeled dataset 500 for clustering at the next iteration. At each iteration when the clusters are formed, the clusters may be evaluated for containing noisy data and bad clustered points that can both be added to the unlabeled set for the evaluation at next iteration. In some embodiments, cluster searching may end when the model reaches predetermined stopping criteria or no new clusters are found over a predetermined number of iterations.

Figure 6:
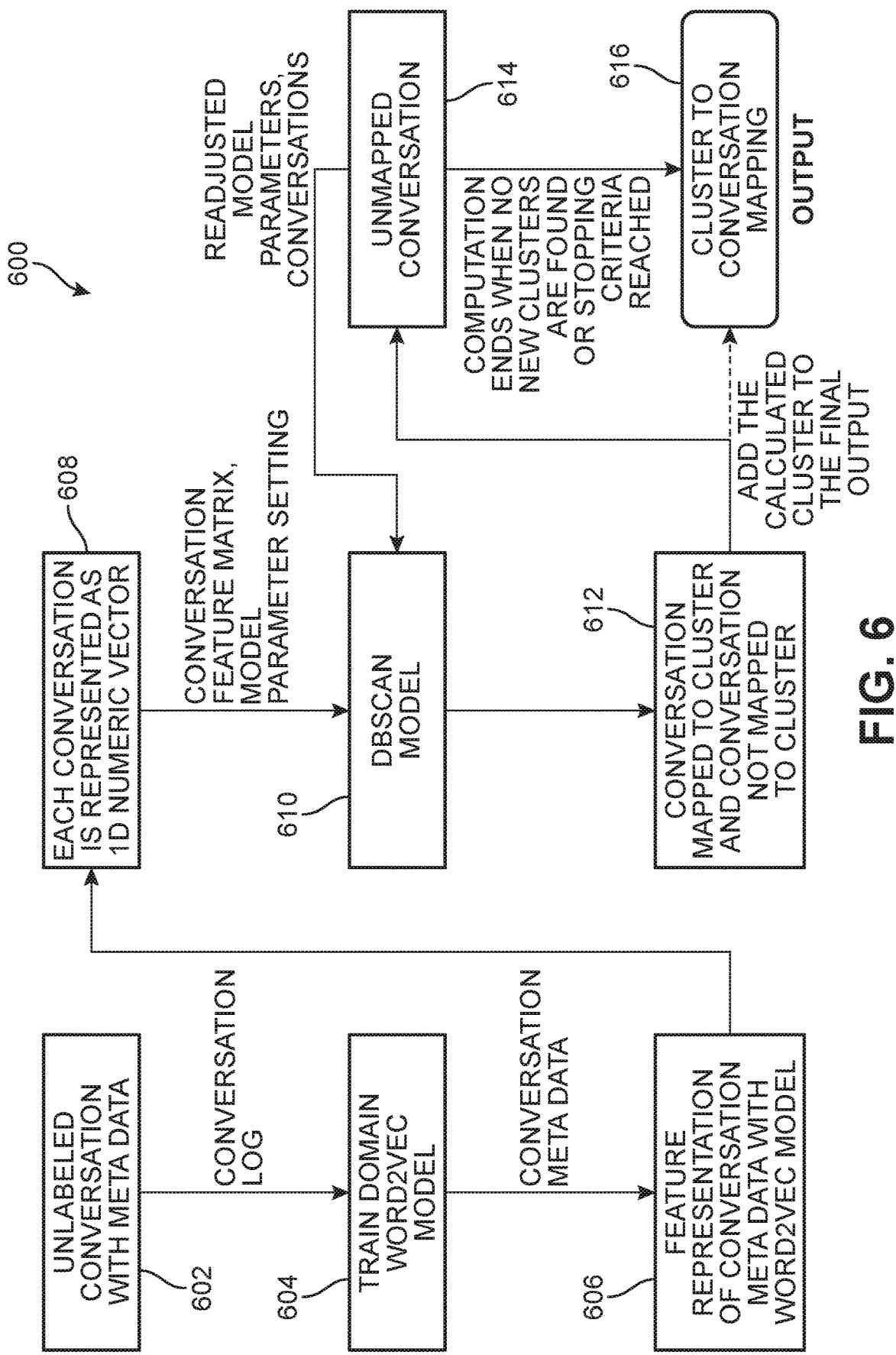
FIG. 6 is a schematic diagram of a detailed flow of clustering, according to an embodiment.

FIG. 6 is a schematic diagram of a detailed flow of clustering 600, according to an embodiment. A set of unlabeled conversations with meta data 602 can be converted to feature representations. The unlabeled conversations may include entire conversations or only portions of the conversations (e.g., a user's first utterance, a user's first few utterances, or a portion of the user's and responsive human or robot's utterances. The set of conversations may include a conversation (or chat) log. The set of conversations may be used to train a domain-specific model (e.g., a domain-specific word2vec model) 604, which contains a numerical representation in the form of a vector for each word in the conversations. This model may be used to convert text data to numerical representation. For example, according to the embodiment shown in FIG. 6, the meta data from the set of conversations is converted to feature representation by a word2vec model 606. According to the same embodiment, after conversion, each conversation may be represented as a 1D numeric vector 608. A conversation feature matrix may be generated and at least one model parameter may be set. The feature representations may be run through a DBSCAN model 610. As a result of running the DBSCAN model, a first set of conversations may be mapped to a first set of clusters and a second set of conversations may not be mapped to the first set of clusters 612.

The first set of conversations (or first set of clusters) may be added to a final cluster to conversation mapping 616. The second set of conversations may be labeled as unmapped conversations 614. Then, the unmapped conversations may be run through a subsequent iteration of the DBSCAN model 610 in which one or both of the parameters are adjusted. For example, as discussed above, a parameter in the previous iteration may be set to capture relatively large clusters, and the same parameter may be adjusted in the subsequent iteration to capture a smaller cluster. The clustering process may be ended when no new clusters are found or stopping criteria is reached.

Figure 7:
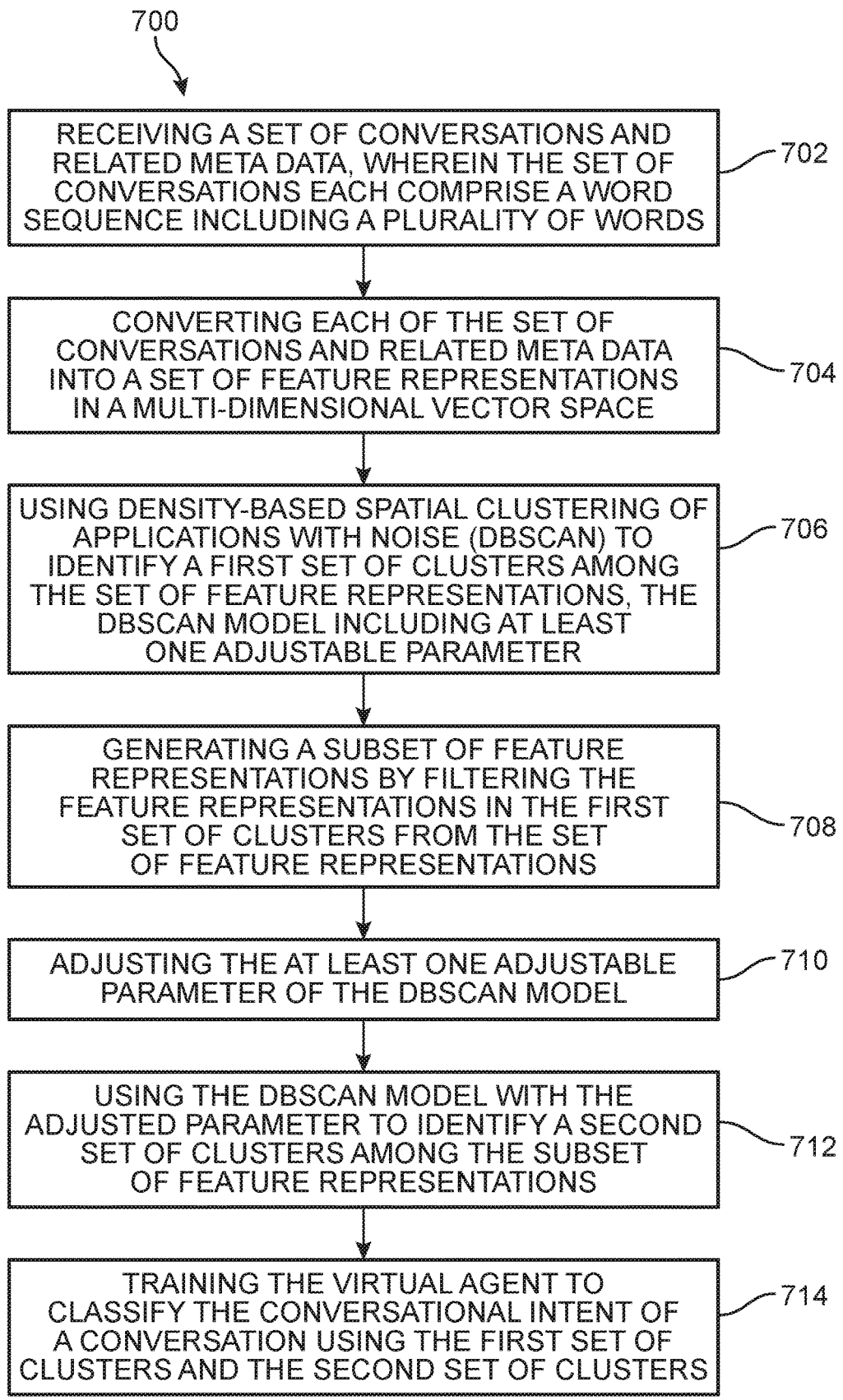
FIG. 7 is a method of training a virtual agent to identify a user's intent from a conversation, according to an embodiment.

FIG. 7 shows an embodiment of a method of training a virtual agent to identify a user's intent from a conversation 700 (or method 700). The method may include receiving a set of conversations and/or related meta data. For example, as shown in FIG. 7, method 700 includes receiving a set of conversations and related meta data (operation 702). It is understood that this set of conversations may be unlabeled. In some embodiments, the set of conversations may each comprise a word sequence including a plurality of words. In some embodiments, the sets of conversations may include utterances in human-human and human-machine dialogues. For example, in some embodiments, the sets of conversations may include multiple conversations between a human user and a human Information Technology (IT) support staff team member. In another example, in some embodiments, the sets of conversations may include multiple conversations between a human user and an IT support robot. The meta data may include a shorter set of words that indicates the user's intent. For example, the meta data may include a summary of a conversation. In some embodiments, a human may create a summary of a conversation and the summary may be used as input into the clustering model. Examples of conversation summaries includes "unable to log in", "unable to connect", or "unable to make external calls." Another example of meta data is an utterance (or multiple utterances) within a conversation describing a problem statement indicating the user's intent. For example, "I am unable to log in to Skype after my password was reset" or "I can't connect to Skype from home" may be utterances from within a conversation that are used as input in the clustering model.

In some instances, a full conversation (e.g., chat log) may be available without meta data. In other words, no summary or distinctive utterance(s) from the conversation has been provided. In this instance, a dialogue act classifier may be used to identify a customer utterance within the full conversation that describes the problem statement (e.g., where the user utterance belongs to either "Information" or "Question" category from the dialogue act classifier output).

The method may include converting each of the set of conversations and/or related meta data into a set of feature representations in a multi-dimensional space. For example, as shown in FIG. 7, method 700 includes converting each of the set of conversations and related meta data into a set of feature representations in a multi-dimensional space (operation 704). Converting each of the conversations into feature representations in a multi-dimensional vector space can provide a set of data points that can be clustered within the multi-dimensional vector space. The clusters may represent conversations that are similar to one another, which means that the clusters may include conversations in which users have a similar intent.

In some embodiments, converting each of the set of conversations and related meta data into a set of feature representations may include using a conversation (or chat) log to train a domain-specific model (e.g., a domain-specific word2vec model) to learn the domain word representation to convert meta data to numerical representations from text representations. The domain-specific model may contain a numerical representation in the form of a vector for each word in the conversation log. This model may be used to convert text data to numerical representation. In some embodiments, when a full conversation is not available a similar domain model can be used as a word representation model. For example, a word2vec trained on Skype can be used for Outlook. In another example, a pre-trained open source model (e.g., glove trained on Wikipedia) may be used as a word representation model.

In some embodiments, conversation meta data is the main input to the clustering algorithm to cluster the conversations. The length of the text of meta data is very small compared to a whole conversation. The smaller size of meta data makes it easier to use for clustering than whole conversations. As discussed above, the meta data (e.g., conversation summary) can be in the form of text data, which is converted to numerical representation by using domain word2vec model. In some embodiments, the text may be converted by performing one or more of the following steps: (1) the text is normalized by removing all the punctuation; (2) tokens are extracted from the text by splitting (whitespace splitter); (3) stop words are removed; (4) for each token, vectors are extracted from the word2vec model (output of this step is a 2-D matrix where each row represents a vector for each word); (5) word-vectors are added and normalized by the number of words which generates a 1-D representation of the conversation meta data. Unseen words in the text may be initialized using a normal distribution between a range (−1, 1).

The method may include using DBSCAN to identify a first set of clusters among the set of feature representations, the DBSCAN model including at least one adjustable parameter. For example, as shown in FIG. 7, method 700 includes using DBSCAN to identify a first set of clusters among the set of feature representations, the DBSCAN model including at least one adjustable parameter (operation 706). For example, one of the distance between data points in a cluster and the minimum number of data points in a cluster may be adjustable. In some embodiments, the DBSCAN may include two adjustable parameters. For example, both the distance between data points in a cluster and the minimum number of data points in a cluster may be adjustable.

The method may include generating a subset of feature representations by filtering the feature representations in the first set of clusters from the set of feature representations. For example, as shown in FIG. 700, method 700 includes generating a subset of feature representations by filtering the feature representations in the first set of clusters from the set of feature representations (operation 708).

The method may include adjusting the at least one adjustable parameter of the DBSCAN model. For example, as shown in FIG. 7, method 700 includes adjusting the at least one adjustable parameter of the DBSCAN model (operation 710).

The method may include using the DBSCAN model with the adjusted parameter to identify a second set of clusters among the subset of feature representations. For example, as shown in FIG. 7, method 700 includes using the DBSCAN model with the adjusted parameter to identify a second set of clusters among the subset of feature representations (operation 712).

The method may include training the virtual agent to classify the conversational intent of a conversation using the first set of clusters and the second set of clusters. For example, as shown in FIG. 7, method 700 includes training the virtual agent to classify the conversational intent of a conversation using the first set of clusters and the second set of clusters (operation 714).

In some embodiments, once the conversations are clustered, a human expert may go through the clustered conversations to include or exclude an entire cluster or one or more conversations within a cluster. If a cluster is removed all the points in that cluster are considered again for new cluster generation. If one or more conversations are removed the data points corresponding to the one or more conversations.

If the cluster is correctly formed with a similar set of conversations, a label may be added to cluster, hence adding a label directly to multiple conversations at once. Once a clustering job is done and no other clustering can be found, a classification model can be trained with a conversation and a corresponding label to create a intent model to infer user goals during conversations. In some embodiments, the disclosed intent training may be done on the actual conversations, where training data is collected by extracting the first few utterances of the customer and an intent label is used as an end class to build a mapping function. This step is called label propagation, since partially labelled data gives an estimate of different classes, this set may be used for training a mapping function from conversation to intent. The unlabeled data after the clustering phase may be used in this step to propagate the label with high confidence prediction to the unlabeled data. In some embodiments, after this step 90-97% data can be annotated with a classifier for user intent to use in chat bot.

In some embodiments, instead of training a classifier to propagate the label to the unlabeled points, an active learning mechanism can add labels to all the data points. In some embodiments, active learning may train a classifier to find the points with very low confidence which may then be passed to human expert for labelling.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of training a virtual agent to identify user's intent from a conversation, comprising:
    receiving a set of conversations and related meta data, wherein the set of conversations each comprise a word sequence including a plurality of words;
    converting each of the set of conversations and related meta data into a set of feature representations in a multi-dimensional vector space;
    using density-based spatial clustering of applications with noise (DBSCAN) to identify a first set of clusters among the set of feature representations, the DBSCAN model including at least one adjustable parameter;
    labeling the clusters in the first set of clusters;
    generating a subset of feature representations by removing all of the feature representations belonging to the first set of clusters from the set of feature representations such that the subset of feature representations includes only feature representations not belonging to the first set of clusters;
    removing at least one mislabeled conversation from a cluster of the first set of clusters;
    adding the mislabeled conversation to the subset of feature representations;
    adjusting the at least one adjustable parameter of the DBSCAN model;
    using the DBSCAN model with the adjusted parameter to identify a second set of clusters among at least the subset of feature representations and the at least one mislabeled conversation;
    labeling the clusters of the second set of clusters; and
    training the virtual agent to classify the conversational intent of a conversation using the first set of clusters and the second set of clusters.

2. The method of claim 1, wherein each feature representation is a data point and the at least one adjustable parameter is the minimum distance between data points in a cluster.

3. The method of claim 2, wherein adjusting the at least one adjustable parameter includes adjusting the minimum distance between data points to be larger.

4. The method of claim 1, further comprising:
    re-adjusting the at least one parameter of the DBSCAN model; and
    using the DBSCAN model with the re-adjusted parameter to identify a third set of clusters.

5. The method of claim 4, wherein using the DBSCAN model with the re-adjusted parameter to identify a third set of clusters includes identifying the third set of clusters among outliers resulting from using the DBSCAN model with the adjusted parameter to identify a second set of clusters among at least the subset of feature representations and the at least one mislabeled conversation.

6. The method of claim 4, further comprising removing at least one mislabeled conversation from a cluster of the second set of clusters and wherein using the DBSCAN model with the re-adjusted parameter to identify a third set of clusters includes identifying the third set of clusters among the at least one mislabeled conversation from the cluster of the second set of clusters and outliers resulting from using the DBSCAN model with the adjusted parameter to identify a second set of clusters among the subset of feature representations and the at least one mislabeled conversation from the cluster of the first set of clusters.

7. The method of claim 1, wherein each feature representation is a data point and the at least one adjustable parameter is the minimum number of data points in a cluster.

8. The method of claim 7, wherein adjusting the at least one adjustable parameter includes adjusting the minimum number of data points to be smaller.

9. A non-transitory computer-readable medium storing software comprising instructions executable by one or more computers which, upon such execution, cause the one or more computers to:
    receive a set of conversations and related meta data, wherein the set of conversations each comprise a word sequence including a plurality of words;
    convert each of the set of conversations and related meta data into a set of feature representations in a multi-dimensional vector space;
    use density-based spatial clustering of applications with noise (DBSCAN) to identify a first set of clusters among the set of feature representations, the DBSCAN model including at least one adjustable parameter;
    label the clusters in the first set of clusters;
    generate a subset of feature representations by removing all of the feature representations belonging to the first set of clusters from the set of feature representations such that the subset of feature representations includes only feature representations not belonging to the first set of clusters;
    remove at least one mislabeled conversation from a cluster of the first set of clusters;
    add the mislabeled conversation to the subset of feature representations;
    adjust the at least one adjustable parameter of the DBSCAN model;
    use the DBSCAN model with the adjusted parameter to identify a second set of clusters among at least the subset of feature representations and the at least one mislabeled conversation;
    label the clusters of the second set of clusters; and
    train the virtual agent to classify the conversational intent of a conversation using the first set of clusters and the second set of clusters.

10. The non-transitory computer-readable medium storing software of claim 9, wherein each feature representation is a data point and the at least one adjustable parameter is the minimum distance between data points in a cluster.

11. The non-transitory computer-readable medium storing software of claim 10, wherein adjusting the at least one adjustable parameter includes adjusting the minimum distance between data points to be larger.

12. The non-transitory computer-readable medium storing software of claim 9, wherein each feature representation is a data point and the at least one adjustable parameter is the minimum number of data points in a cluster.

13. The non-transitory computer-readable medium storing software of claim 12, wherein adjusting the at least one adjustable parameter includes adjusting the minimum number of data points to be smaller.

14. The non-transitory computer-readable medium storing software of claim 9, wherein the instructions, upon execution, further cause the one or more computers to:

re-adjust the at least one parameter of the DBSCAN model; and use the DBSCAN model with the re-adjusted parameter to identify a third set of clusters.

15. A system for training a virtual agent to identify user's intent from a conversation, comprising:
one or more computers and one or more storage devices storing instructions that are operable, when executed by the one or more computers, to cause the one or more computers to:
receive a set of conversations and related meta data, wherein the set of conversations each comprise a word sequence including a plurality of words;
convert each of the set of conversations and related meta data into a set of feature representations in a multi-dimensional vector space;
use density-based spatial clustering of applications with noise (DBSCAN) to identify a first set of clusters among the set of feature representations, the DBSCAN model including at least one adjustable parameter;
label the clusters in the first set of clusters;
generate a subset of feature representations by removing all of the feature representations belonging to the first set of clusters from the set of feature representations such that the subset of feature representations includes only feature representations not belonging to the first set of clusters;
remove at least one mislabeled conversation from a cluster of the first set of clusters;
add the mislabeled conversation to the subset of feature representations;
adjust the at least one adjustable parameter of the DBSCAN model;
use the DBSCAN model with the adjusted parameter to identify a second set of clusters among at least the subset of feature representations and the at least one mislabeled conversation;

label the second set of clusters; and
train the virtual agent to classify the conversational intent of a conversation using the first set of clusters and the second set of clusters.

16. The system of claim 15, wherein each feature representation is a data point and the at least one adjustable parameter is the minimum distance between data points in a cluster.

17. The system of claim 16, wherein adjusting the at least one adjustable parameter includes adjusting the minimum distance between data points to be larger.

18. The system of claim 15, wherein each feature representation is a data point and the at least one adjustable parameter is the minimum number of data points in a cluster.

19. The system of claim 18, wherein the instructions, upon execution, further cause the one or more computers to:
re-adjust the at least one parameter of the DBSCAN model; and
use the DBSCAN model with the re-adjusted parameter to identify a third set of clusters.

20. The system of claim 15, wherein the instructions, upon execution, further cause the one or more computers to:
remove at least one mislabeled conversation from a cluster of the second set of clusters; and
wherein using the DBSCAN model with the re-adjusted parameter to identify a third set of clusters includes identifying the third set of clusters among the at least one mislabeled conversation from the cluster of the second set of clusters and outliers resulting from using the DBSCAN model with the adjusted parameter to identify a second set of clusters among the subset of feature representations and the at least one mislabeled conversation from the cluster of the first set of clusters.

* * * * *